United States Patent
Modi

(10) Patent No.: US 12,456,149 B1
(45) Date of Patent: Oct. 28, 2025

(54) LIQUIDITY INDEX ENGINE

(71) Applicant: Cboe Exchange, Inc., Chicago, IL (US)

(72) Inventor: Nishank Modi, Chicago, IL (US)

(73) Assignee: Cboe Exchange, Inc., Chicago, IL (US)

(*) Notice: Subject to any disclaimer, the term of this patent is extended or adjusted under 35 U.S.C. 154(b) by 130 days.

(21) Appl. No.: 18/392,492

(22) Filed: Dec. 21, 2023

Related U.S. Application Data

(60) Provisional application No. 63/435,051, filed on Dec. 23, 2022.

(51) Int. Cl.
*G06Q 40/04* (2012.01)
(52) U.S. Cl.
CPC .................................. *G06Q 40/04* (2013.01)
(58) Field of Classification Search
CPC ........................................................ G06Q 40/04
See application file for complete search history.

(56) References Cited

U.S. PATENT DOCUMENTS

| | | | |
|---|---|---|---|
| 11,551,305 B1* | 1/2023 | Guzman | G06Q 40/08 |
| 12,236,483 B1* | 2/2025 | Hiatt | G06Q 40/04 |
| 2018/0211317 A1* | 7/2018 | Chiong | G06Q 30/0185 |

FOREIGN PATENT DOCUMENTS

| | | | | |
|---|---|---|---|---|
| WO | WO-2008089213 A2 * | 7/2008 | | G06Q 40/02 |
| WO | WO-2014046869 A2 * | 3/2014 | | G06Q 40/04 |

OTHER PUBLICATIONS

Yan et al.: Intelligent Evaluation and Early Warning of Liquidity Risk of Commercial Banks based on RNN, 2022, Hindawi, Computational Intelligence and Neuroscience, vol. 2022, Article ID 7325798, pp. 1-12 (Year: 2022).*

Zhang et al.: CSI 300 Stock Index Futures to Launch an Empirical Research on A -Share of the Spot Market Pricing Efficiency and Operatring Efficiency Influence, 2012, 2012 Fifth International Conference on Business Intelligence and Financial Engineering, pp. 399-403. (Year: 2012).*

* cited by examiner

*Primary Examiner* — Bijendra K Shrestha
(74) *Attorney, Agent, or Firm* — Fish & Richardson P.C.

(57) ABSTRACT

An exchange computer system, a method, and non-transitory computer-readable storage media for generating an implied liquidity index and values. The exchange computer system receives data related to a plurality of stocks, data related to a stock market index, and data related to a plurality of stock options. The exchange computer system selects a plurality of component stock options, determines a quantity of available stock option contracts for each of the stock options in the plurality of component stocks options, applies one or more of (i) a price normalization, (ii) a relative bid-ask spread normalization, or (iii) an expiry normalization. The exchange computer system determines an option contract multiplier and generates, for a particular period of time, an implied liquidity index value based the option contract multiplier and the applied normalization and transmits the implied liquidity index value to a device connected to the exchange computer system.

20 Claims, 5 Drawing Sheets

LIQUIDITY INDEX ENGINE

CROSS-REFERENCE TO RELATED APPLICATION

This application claims the benefit of U.S. Provisional Patent Application No. 63/435,051, filed Dec. 23, 2022, which is incorporated herein by reference in its entirety.

TECHNICAL FIELD

This application relates to technology for trading financial instruments in electronic exchanges, as well as hybrid exchanges that combine electronic and open-outcry trading mechanisms.

BACKGROUND

High volumes of financial instruments such as derivatives, stocks, and bonds are continuously traded at electronic exchanges, which enable trades to occur in real time through the algorithmic processing of orders and associated market information. Generally, a trade may be executed when the price associated with a bid to purchase a financial instrument matches the price associated with an offer to sell the same instrument. Market participants typically price their bids and offers based on market conditions, which are subject to rapid change, and electronic exchanges often match bids and offers based on price-time priority, and the principle of first-in, first-out (FIFO).

SUMMARY

In an electronic or hybrid exchange environment, thousands of transactions are executed each second, and unforeseen events occur frequently. Many market participants rely on intelligence derived from market data to inform their decisions and actions, but individual participants lack the technological means to continuously monitor the vast amount of data generated each second through trading activity. An exchange computer system with sufficient bandwidth and processing resources can, however, translate the data flowing through it and available from other networked sources into actionable intelligence that connected users can rely upon.

For example, and as described in more detail within the following disclosure an exchange computer system can be configured to generate an implied liquidity index based on vast amounts of information continuously received through a computer network. The exchange computer system is also configured to efficiently and continuously disseminate associated implied liquidity index values through a network connected to computing devices in real-time, as the values are updated.

By providing the implied liquidity index and implied liquidity index values, the exchange computer system enables users, market participants, and other involved parties to more precisely manage their respective risks, while at the same time preventing the need for expenditure of bandwidth and other computing resources on additional transactions associated with trading options and other financial instruments. For example, the implied liquidity index provides a trading signal to market participants about the liquidity of orders in a stock exchange. A low implied liquidity index value can indicate to market participants that orders in stock exchange have a low likelihood of execution (relative to nominal or high liquidity), and thus result in positions where the market participant may not be able to exit high risk positions from unfavorable market conditions.

Market participants may look at multiple factors when trading options, such as spot price, implied volatility, and liquidity. Market liquidity is a key indicator of market efficiency, as highly liquid markets indicate that a financial instrument can be quickly executed without causing significant change in the underlying price of the financial instrument. A market with low liquidity may take substantial time to execute, and may also substantially impact the underlying price of the financial instrument.

While standardized measures and estimations for spot price and implied volatility are accessible, a standardized measure for market liquidity has yet to be widely adopted by stock market exchanges in part, because of the difficulty to represent such liquidity in a meaningful real-time manner that is easily understood and can adapt based on the various parameters that impact liquidity. Market participants may access databases and market terminals to comb through large quantities of options data, but cannot quickly infer the liquidity of a stock market index based on the options data. An option gives the holder a right, but not an obligation, to purchase or sell an underlying security at a certain price, within a certain timeframe. However, trading options and options data can be incredibly complicated given the depth of the analysis necessary to identify trends and develop market strategies. For example, numerous variables, such as Greek variables associated with types of risk, are used to assess risk in the options market. Additionally, options data of stock option contracts in one or more stock market indexes are not standardized in a way that is helpful to the user, given the complexity and numerous factors associated with estimating or measuring market liquidity (e.g., stock market index liquidity).

The implied liquidity index and implied liquidity index values enabled through the technology described in this application provides users with high-quality, up-to-date market intelligence of the estimated liquidity of any stock market index. Multiple types of normalization from options trading aspects such as expiry, implied volatility, price, and relative bid-ask spread of stock options contracts in a stock market options exchange are analyzed to generate the implied liquidity index and implied liquidity index values, therefore providing a holistic, accurate representation of liquidity in the stock market options exchange.

When considering these innovations, it is important to bear in mind that in an electronic or hybrid exchange environment, many thousands of transactions are executed each second, and unforeseen events occur frequently. Many market participants rely on intelligence derived from market data to inform their decisions and actions, but individual participants can lack the technological means to continuously monitor the vast amount of data generated each second through trading activity.

An exchange computer system implemented in accordance with the technology described in this application, and with sufficient bandwidth and processing resources can, however, translate the data flowing through it and available from other networked sources into actionable intelligence that connected users can rely upon.

For example, and as described in more detail within the following disclosure, an exchange computer system can be implemented in a manner enabling it to dynamically, efficiently, and continuously generate an implied liquidity index based on vast amounts of information continuously received through a computer network, and further enabling it to efficiently and continuously disseminate associated values through that network to connected computing devices in real-time, as the values are updated.

Continuously updating and disseminating the values to a plurality of connected computing devices based on data received by the exchange computer system in real-time enables the users associated with those devices to rapidly take responsive actions that otherwise would have been unavailable to them, and to implement complex strategies involving financial instruments based on the implied liquidity index for which the values are generated.

For example, the exchange computer system can securely transmit a series of implied liquidity index values generated based on data received over successive periods of time to connected user computing devices that are themselves configured to display the implied liquidity index values. The values may be displayed, for example, within a graphical user interface of an application that facilitates continuous real-time trading, through the exchange computer system, of financial instruments related to the implied liquidity index.

In that regard, the generated index and associated values ultimately reduce the bandwidth and computing resources required by the exchange and networked computer systems by, for example, reducing the number of orders that ultimately need to be processed in connection with strategies that can be more elegantly executed with index-based financial instruments.

Further, processing the data required to generate the implied liquidity index and the associated values through the exchange computer system relieves other connected systems of the computational burdens involved, thereby increasing the computational efficiency of the network as a whole.

And, as explained in more detail below, the exchange computer system can be configured to generate the implied liquidity index and associated values in a computationally efficient manner by doing so on the basis of a subset of financial instruments such as a subset of options contracts from an options market, can together provide a representative sample of liquidity in the underlying options market, while at the same time minimizing the processing and storage burdens involved.

Many market participants utilize market intelligence e.g., computed measures, to inform decisions and build effective trading strategies involving complex order types made available by electronic exchanges. Indication of highly liquid market conditions can provide a trading signal to market participants that trades will be executed quickly at a desirable price, given the numerous buyers and sellers participating in the stock market. An indication of a highly liquidity market also indicates to a trading signal to the market participant that a financial instrument is high in demand and the spread between a buyer's bid price and a seller's ask price is substantially small. Indication of an illiquid market or thin market provides a trading signal that trades are being executed inefficiently, with possible spreads larger than a market participant is willing to risk. Illiquid markets may force market participants to accept offers lower than the desired bid amount, or to be stuck with financial instruments that they no longer wish to own.

Due to the lack of accurate representation of the contribution of the implied liquidities of multiple component stocks in a stock market index to the overall stock market index performance, market participants generally have few available trading strategies reliant on diverse, long liquidity methods of trading. Issues in identifying the source of implied liquidity of stock market indexes arise from the possibility that the complex nature of options trading obscures particular drivers of liquidity, such as expiry, price, bid-ask spreads, implied volatility, and other aspects of options contracts. As an example, the implied liquidity of the stock market index can rise or fall without a corresponding shift in the implied liquidities of the component stock options.

As described in more detail within this application, an exchange computer system can be implemented in a manner allowing it to dynamically, efficiently, and continuously generate an implied liquidity index based on vast amounts of information received through a computer network, and to efficiently and continuously disseminate associated values through that network to connected computing devices in real-time, as the values are updated. An implied liquidity index value may provide a single, standardized, option-based measure of market efficiency and liquidity of component stock options and the stock market index (e.g., Standard and Poor's 500 Index). An implied liquidity index may provide a total normalized measure of availability of the component stock options on the stock market index, based on implied volatility of the component stock options.

The implied liquidity index facilitates long liquidity strategies (e.g., benefitting from increased portfolio diversification and consistent, highly mobile trading environments) for market participants and more efficient market opportunities to quickly execute trading strategies, corresponding to decreases in the stock market index implied liquidity and increases in the component stock implied liquidities.

An implied liquidity index also provides market participants an improved ability to perform high liquidity trading strategies, by offering at-the-money options of corresponding component stock options in the stock market index. The implied liquidity index provides additional market intelligence to perform these trades by executing the purchase of the component stock options on a weighted basis, with weights of the component stock options representing the contribution of the implied liquidity of the corresponding component stock options with respect to the stock market index. A liquidity trade (e.g., a trade performed on the implied liquidity index) facilitates advanced trading strategies for the market participant when, e.g., the implied liquidity of the stock market index is high.

An exchange computer system that is configured to generate an implied liquidity index and disseminate implied liquidity index values allows for orders to be executed from an index that uniquely and accurately tracks the liquidity of a stock market index, its component stocks, and component stock options. Thus, the implied liquidity index allows for improved efficiencies within the exchange computer system by trading shares of a liquidity index, rather than receiving numerous orders for multiple component stocks options with a large number of legs that may not be fulfilled by the exchange computer system.

Generating an implied liquidity index provides market participants additional information to execute trading strategies. Unlike other systems, the implied liquidity index described in this disclosure provides an additional benchmark to measure the performance of a basket of stock options, including an individual market participant's portfolio, a stock market index, and multiple stock indexes. The implied liquidity index is an options-based index, providing availability for market participants to execute complex orders with the additional information provided by the implied liquidity index. As an example, the implied liquidity index is effective in providing the market participant an opportunity to execute strategies such as shorting liquidity of a corresponding stock market index.

The implied liquidity index also provides additional advantages compared to other indices generated by, e.g., selecting a number of stock options based on ask price, ask size, bid price to be, and bid size. The implied liquidity index provides an updated, accurate measure without skewing towards particular sectors, excluding less prominent types of funds, and unnecessarily introducing fees associated with higher than nominal trade turnover.

The implied liquidity index provides an advantage in selecting a representative sample of component stock options without overweighting towards one or more sectors corresponding to component stocks. As an example, particular sectors associated with the component stocks may undergo periods of high liquidity due to external factors or drastic changes (e.g., particular legislation impacts, resource limitations, breakthrough in technologies, adverse algorithmic traders) in the market. The implied liquidity index provides a representative sample (e.g., a basket of component stock options) of a stock market index (e.g., Standard and Poor's 500 Index) while minimizing the number of components used to generate the sample. An additional advantage of the selection of the representative sample of the stock market index by generating the implied liquidity index is that liquidity of the options corresponding to the representative sample have a high correlation with respect to the liquidity of the stock market index. The high correlation between liquidity of the stock market index being measured in the implied liquidity index, and the liquidity of the options, provides an intelligible, equitable, and transparent trading signal to the market participants.

An additional advantage of the implied liquidity index includes the selection process for representing a stock market index when generating the implied liquidity index. For example, providing market intelligence by estimating measures of the stock market index is a computationally burdensome process when based on a population of options contracts in a stock market options index. The generation of the implied liquidity index includes selecting options corresponding to some, but not necessarily all, of the component stock options in the stock market options index, thereby expediting the processing and dissemination of implied liquidity index data. As an example, the construction of some existing market indexes are limited by back calculating based on historical data of the stock market options index being measured. The implied liquidity index can, however, be rapidly and readily generated and then disseminated on a continuous basis to external devices.

Further, in addition to providing real-time market intelligence relating to the implied volatility of an underlying market, the implied liquidity index allows market participants to trade futures contracts, options, and other types of derivatives in combination with financial instruments based on the implied liquidity index itself.

In calculating and disseminating the implied liquidity index, an additional advantage includes a centrally located source of market intelligence related to the implied liquidities of a stock market options index. For example, the implied liquidity index provides a high quality representation (e.g., measurement, estimate) of the underlying options market, and thereby provides users of devices connected to the exchange computer system with an efficient means of analyzing and executing on trading strategies informed by implied liquidity data. For example, some users may heavily rely on real-time, readily accessible data to efficiently execute numerous (e.g., high-volume) trades. Continuously generated and disseminated implied liquidity index values can facilitate these strategies.

In one aspect, an exchange computer system is configured to continuously, securely, dynamically, and efficiently generate and disseminate implied liquidity index values. The exchange computer system includes at least one communication interface that is configured to receive, from one or more remote computing devices connected to the exchange computer system via a computer network, data related to a plurality of stocks, data related to a stock market index, and data related to a plurality of stock options, wherein the plurality of stock options correspond to the plurality of stocks, and wherein the plurality of stocks are traded on a stock market. The exchange computer system includes at least one non-transitory computer-readable medium configured to store, for a particular period of time, the data related to the plurality of stocks, the data related to the stock market index, and the data related to the plurality of stock options; and an index engine including at least one hardware processor coupled with the at least one non-transitory computer-readable medium, wherein the at least one non-transitory computer-readable medium is further configured to store computer-executable instructions that when executed by the at least one hardware processor, cause the index engine to perform processes.

The processes performed by the index engine include automatically selecting, based on the data related to the plurality of stock options, a plurality of component stock options that together provide a representative sample of the stock market index while a number of stock options included in the plurality of component stocks options is maintained below a threshold number, thereby reducing processing overhead associated with generating an implied liquidity index value. The processes includes determining, based on the data related to the plurality of stock options, a quantity of available stock option contracts for each of the stock options in the plurality of component stocks options, wherein the quantity of available stock option contracts includes determining a number of available stock options with a corresponding bid price and a number of available stock options with a corresponding ask price. The processes can include applying, based on the data related to the plurality of stock options, a price normalization to the quantity of available stock option contracts for each of the stock options in the plurality of component stock options, wherein the price normalization includes determining at least one of (i) an option contract price, or (ii) a rate of change, for each of the stock options in the plurality of component stock options. The processes can include applying, based on the data related to the plurality of stock options and the data related to the plurality of stocks, a relative bid-ask spread normalization for each of the stock options in the plurality of component stock options, wherein the relative bid-ask spread normalization is based on a bid price and an ask price of a component stock option and an underlying price of the corresponding stock for each of the stock options in the plurality of component stock options. The processes can include applying, based on the data related to the plurality of stock options, an expiry normalization for each for the stock options in the plurality of component stock options, where the expiry normalization includes determining a time weighting for each of the stock options in the plurality of component stock options. The processes can include determining, based on the plurality of component stock options, an option contract multiplier, wherein the option contract multiplier indicates a number of shares representing in each of the stocks in the plurality of component stock options. The processes can include generating, for the particular period of time, an implied liquidity index value based at least one of (i) the option contract multiplier, (ii) the price normalization, (iii) the relative bid-ask spread normalization, or (iv) expiry normalization of each of the plurality of stock options in the plurality of component stock options. The processes include securely transmitting the implied liquidity index value to a plurality of user computing devices that are connected to the exchange computer system via the computer network and that are configured to display the implied liquidity index value within a graphical user interface of an application that facilitates continuous real-time trading, through the exchange computer system, of financial instruments related to an implied liquidity index for which the implied liquidity index value was generated.

In some implementations, the computer-executable instructions, when executed by the at least one hardware processor, cause the index engine to perform further processes including receiving, through the at least one communication interface, a request from at least one of the plurality of user computing devices for the implied liquidity index value and responsive to receiving the request for the implied liquidity index value, accessing metadata associated with the plurality of user computing devices over at least one communication pathway within the computer network. The processes can include determining that the metadata meets a predetermined threshold, wherein the implied liquidity index value is securely transmitted to the plurality of user computing devices responsive to determining that the metadata meets a predetermined threshold.

In some implementations, determining that the metadata meets a predetermined threshold is based at least in part on one or more attributes of the plurality of user computing devices that are indicated by the metadata.

In some implementations, the implied liquidity index value is securely transmitted to the plurality of user computing devices based at least in part on a distribution list, and the at least one communication interface includes a transceiver having one or more input/output ports connected to the computer network.

In some implementations, the at least one non-transitory computer-readable medium includes a memory device configured to receive volatility data from the computer network through the at least one communication interface, tag the volatility data according to a first time period tag indicative of a first particular time period for which the volatility data is stored, store the volatility data and the first time period tag, and provide the volatility data and the first time period tag to the at least one hardware processor. The at least one hardware processor is further configured to determine the component stock option volatility for each of the plurality of component stock options for the first particular time period based at least in part on the volatility data provided by the memory device.

In some implementations, the memory device is further configured to receive a reset signal to remove the volatility data that is stored for the first particular time period, delete or archive the volatility data for the first particular time period in response to receiving the reset signal, receive second volatility data from the computer network through the at least one communication interface, tag the second volatility data according to a second time period tag indicative of a second particular time period for which the second volatility data is stored, and store the second volatility data and the second time period tag. The at least one hardware processor is further configured to determine the component stock option volatility for each of the plurality of component stock options for the second particular time period based at least in part on the second volatility data provided by the memory device.

In some implementations, the at least one non-transitory computer-readable medium includes a memory device partitioned into designated memory locations that are allocated based on one or more of a type of stock, a type of stock market index, and a type of stock option. The data related to a plurality of stocks, the data related to a stock market index, and data related to a plurality of stock options that are received through the at least one communication interface are stored in the designated memory locations of the memory device based on a type of the stock market index indicated in the data related to the stock market index, a type of the stock indicated in the data related to the plurality of stocks, and a type of the stock options indicated in the data related to the plurality of stock options.

In some implementations, generating the implied liquidity index value further includes accessing a log file of component stock option volatility for each of the plurality of component stock options. Securely transmitting the implied liquidity index value to a plurality of user computing devices further includes securely transmitting data to the plurality of user computing devices that identifies each of the plurality of component stock options.

In some implementations, the exchange computer system is a distributed computer system that includes the at least one communication interface, the at least one non-transitory computer-readable medium, the index engine, an order entry port that is configured to receive, from a user computer device included in the plurality of user computing devices, an order for a financial instrument corresponding to the implied liquidity index for which the implied liquidity index value was generated, wherein data related to the order was provided by a user through the graphical user interface of the application, an order routing system that is configured to route the order according to a destination associated with the order, and an order matching system.

In some implementations, the order entry port is configured to receive, from a user computer device included in the plurality of user computing devices, an order for a financial instrument corresponding to an implied liquidity index for which the implied liquidity index value was generated. The order routing system is configured to route the order according to a destination associated with the order, and the order matching system is configured to match the order to another order based on one or more matching rules.

In some implementations, the implied liquidity index value provides a single, standardized, option-based measure of market efficiency and liquidity of the plurality of component stock options and the stock market index.

In some implementations, the implied liquidity index is a total normalized measure of availability of the plurality of the component stock options on the stock market index, based on implied volatility of the plurality of component stock options.

In some implementations, applying the price normalization based on the rate of change includes determining at least one of (i) a time sensitivity, (ii) a price sensitivity, (iii) a volatility sensitivity, (iv) or an interest rate sensitivity, for each of the stock options in the plurality of component stock options.

In some implementations, the plurality of component stocks options are automatically selected based at least in part by one of (i) an ask price, (ii) an ask size, (iii) a bid size, or (iv) a bid price. At least one of (i) the ask price, (ii) the ask size, or (iii) the bid size, can be greater than zero. The bid price can be greater than or equal to zero.

In some implementations, the plurality of component stock options are selected such that every stock corresponding to a component stock option has been listed on the stock market for at least a threshold period of time.

In some implementations, the plurality of component stock options are selected such that every stock corresponding to a component stock option has an expiry date between a first date and a second date, before the first date, or after the second date.

In some implementations, the plurality of component stock options are selected based on a moneyness of every stock corresponding to a component stock option, wherein the moneyness of a stock is based on a spot price of the stock and a strike price of the corresponding component stock option.

In some implementations, applying the relative bid-ask spread normalization includes calculating a product of (i) an inverse of a difference between the bid price from the ask price of the component stock option, (ii) a threshold value, and (iii) the underlying price of the corresponding stock, for each of the stock options in the plurality of component stock options. The threshold value can be a number of basis points based the data related to the stock market. Applying the relative bid-ask spread normalization can include applying at least one of (i) a minimum bound, or (ii) a maximum bound, to the product of the inverse of the difference, the threshold value, and the underlying price of the corresponding stock, for each of the stock options in the plurality of component stock options.

In some implementations, determining the time weighting for each of the stock options in the plurality of component stock options includes computing a ratio of (i) a reference time until expiration to (ii) an expiry time until expiration, of each of the stock options in the plurality of component stock options.

In some implementations, generating the implied liquidity index includes generating multiple implied liquidity values, each of the multiple implied liquidity values corresponding to at least one of (i) a global stock market index, (ii) an target expiry-based index, (iii) a bucket expiry-based index, or (iv) a stock option contract-based index, from each of the plurality of stock options in the plurality of component stock options.

In an aspect, a method includes receiving, from one or more devices, data related to a plurality of stocks, data related to a stock market index, and data related to a plurality of stock options, wherein the plurality of stock options correspond to the plurality of stocks, and wherein the plurality of stocks are traded on a stock market. The method includes selecting, based on the data related to the plurality of stock options, a plurality of component stock options, and determining, based on the data related to the plurality of stock options, a quantity of available stock option contracts for each of the stock options in the plurality of component stocks options, wherein the quantity of available stock option contracts includes determining a number of available stock options with a corresponding bid price and a number of available stock options with a corresponding ask price. The method includes applying, based on the data related to the plurality of stock options, a normalization includes one or more of (i) a price normalization to the quantity of available stock option contracts for each of the stock options in the plurality of component stock options, (ii) a relative bid-ask spread normalization for each of the stock options in the plurality of component stock options, or (iii) an expiry normalization for each for the stock options in the plurality of component stock options. The method includes determining, based on the plurality of component stock options, an option contract multiplier. The option contract multiplier can indicate a number of shares representing in each of the stocks in the plurality of component stock options. The method includes generating, for the particular period of time, an implied liquidity index value based the option contract multiplier and the applied normalization, and transmitting the implied liquidity index value to a device connected to the exchange computer system.

In an aspect, at least one non-transitory computer-readable storage media storing instructions that are received by one or more processors of an index engine of an exchange computer system, the instructions causing the one or more processors to perform operations. The operations include receiving, from one or more devices, data related to a plurality of stocks, data related to a stock market index, and data related to a plurality of stock options, wherein the plurality of stock options correspond to the plurality of stocks, and wherein the plurality of stocks are traded on a stock market. The operations include selecting, based on the data related to the plurality of stock options, a plurality of component stock options. The operations include determining, based on the data related to the plurality of stock options, a quantity of available stock option contracts for each of the stock options in the plurality of component stocks options, wherein the quantity of available stock option contracts includes determining a number of available stock options with a corresponding bid price and a number of available stock options with a corresponding ask price. The operations include applying, based on the data related to the plurality of stock options, a normalization including one or more of (i) a price normalization to the quantity of available stock option contracts for each of the stock options in the plurality of component stock options, (ii) a relative bid-ask spread normalization for each of the stock options in the plurality of component stock options, or (iii) an expiry normalization for each for the stock options in the plurality of component stock options. The operations include determining, based on the plurality of component stock options, an option contract multiplier, wherein the option contract multiplier indicates a number of shares representing in each of the stocks in the plurality of component stock options. The operations include generating, for a particular period of time, an implied liquidity index value based the option contract multiplier and the applied normalization; and transmitting the implied liquidity index value to a device connected to the exchange computer system.

The details of one or more embodiments of the subject matter described in this specification are set forth in the accompanying drawings and the description below. Other potential aspects, features, and advantages will be apparent from the description, the drawings, and the claims.

DETAILED DESCRIPTION

The disclosure that follows relates to technology enabling market participants receive market intelligence and submit financial instrument transaction orders related to an implied liquidity index. The implied liquidity index by the disclosed technology can enhance the usefulness of certain trading strategies to market participants, by offering an immediate, highly representative, and effective estimate of implied liquidity of the stock market index. For example, a user can receive disseminated data about the implied liquidity of the stock market index in the form of implied liquidity index values, enter an order for a financial instrument, e.g., call or put option, based on the implied liquidity index, and have that order quickly facilitated through the exchange computer system.

Figure 1:
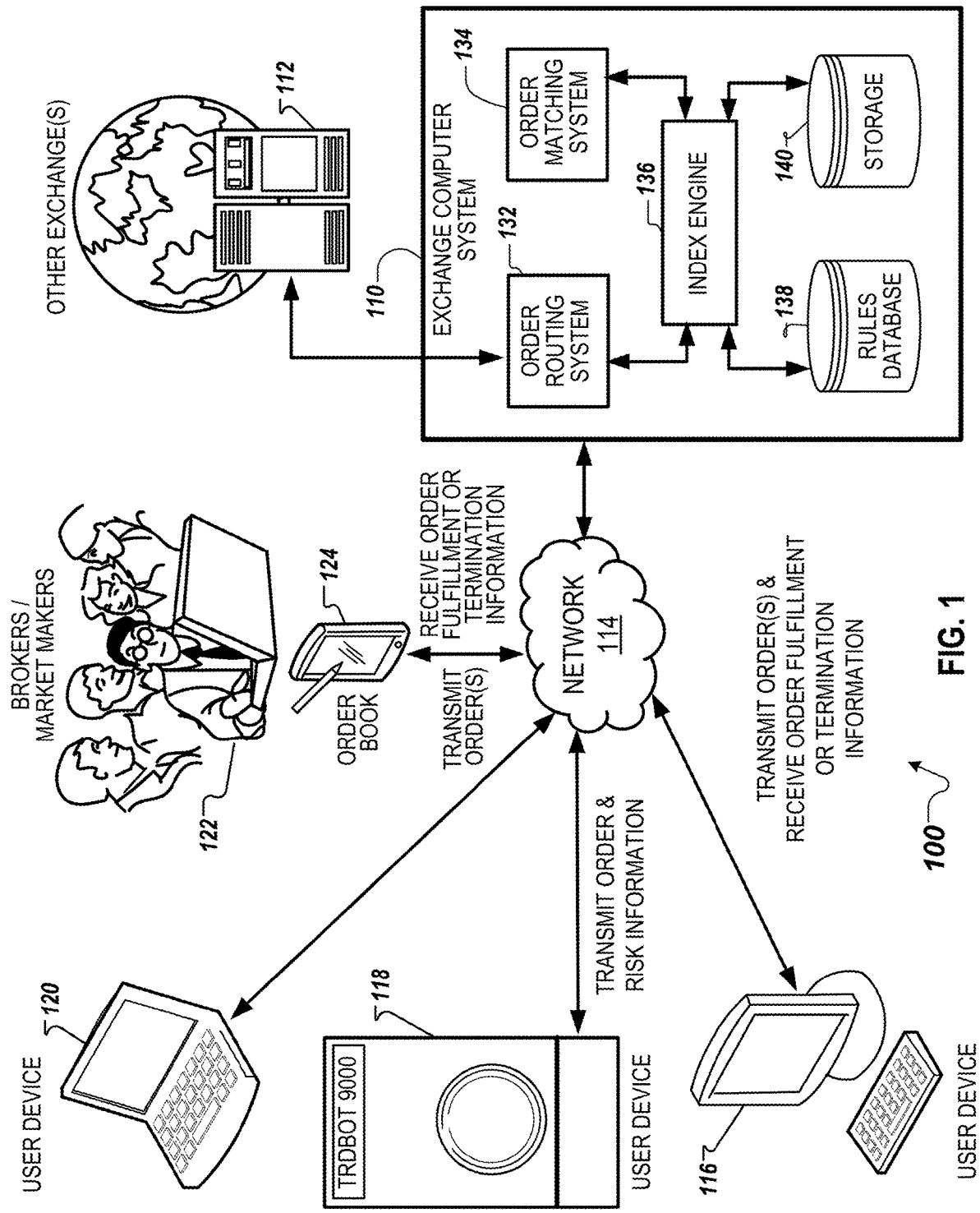
FIG. 1 is an example diagram of an exchange computer system and associated networks, devices, and users.

FIG. 1 is a diagram of an exemplary trading environment 100 for generating an implied liquidity index value that may include an exchange computer system and the associated networks, devices, and users. Generally, the term "user" may refer to any entity that interacts with the exchange computer system and/or associated networks and devices. Users may include, for example, market makers and other market professionals, brokers, institutional traders, individual traders, and automated trading systems. The diagram may include an exchange computer system 110, other exchanges 112, a network 114, user devices 116, 118, 120, market makers/brokers 122, and electronic order book 124.

The exchange computer system 110 may be implemented in a fully electronic manner, or in a hybrid manner that combines electronic trading with aspects of traditional open-outcry systems. The exchange computer system 110 may receive orders for trading financial instruments locally on the floor and from remote electronic devices. The financial instruments may include securities such as stocks, options, futures contracts, or other derivatives associated with an underlying asset.

Network 114 connects the various components within the trading environment, and may be configured to facilitate communications between those components. Network 114 may, for example, be configured to enable the exchange of electronic communications that include order and order fulfillment information between connected devices, such as an electronic order book 124 and the exchange computer system 110.

Network 114 may include one or more networks or subnetworks, each of which may include a wired or wireless data pathway. Network 114 may, for example, include one or more of the Internet, Wide Area Networks (WANs), Local Area Networks (LANs), or other packet-switched or circuit-switched data networks that are capable of carrying electronic communications (e.g., data or voice communications).

To protect communications between the various systems, devices, and components connected to network 114, network 114 may implement security protocols and measures such that data identifying order or bid information, or parties placing orders or quotes, may be securely transmitted. Network 114 may, for example, include virtual private networks (VPNs) or other networks that enable secure connections to be established with exchange computer system 110.

User devices 116, 118, and 120 may include portable or stationary electronic devices, such as smartphones, laptops, desktops, and servers that include user interfaces to display information and receive user input, and that are configured to communicate over a computer network. User devices 116, 118, and 120 may communicate with the exchange computer system 110 over network 114 using a proprietary protocol, or a message-based protocol such as financial information exchange (FIX), implemented over TCP/IP.

User devices 116, 118, and 120 may transmit user input such as order information or risk information to the exchange computer system 110, and may also receive data from the exchange computer system 110 indicating that an order has been filled or canceled.

Users such as brokers/market makers 122 may also place orders and receive information about order fulfillment or termination through electronic order book 124, which may include a record of outstanding public customer limit orders that can be matched against future incoming orders.

The exchange computer system 110 includes an order routing system (ORS) 132, an order matching system (OMS) 134, an index engine 136, a database of trading rules and algorithms 138, and storage 140. In some implementations, the exchange computer system 110 is a distributed computer system.

The order routing system (ORS) 132 determines whether a received order or quote is to be executed at the exchange computer system 110, or should instead be redirected to another exchange 112, and may include processing systems that enable the management of high data volumes. The ORS 132 may, for example, receive order or quote information for the purchase or sale of financial instruments from one or more user devices 116, 118, 120, and 124. In some implementations, the ORS 132 may also be connected to or include a touch-screen order routing and execution system accessible by brokers on the exchange floor, such as a public automated routing (PAR) system.

Upon receiving an order or quote, the ORS 132 determines if the destination specified in the received order or quote is the exchange computer system 110. If the exchange computer system 110 is not the destination, the ORS 132 forwards the order or quote to another exchange 112, which may be either the destination exchange, or an exchange en route to the destination exchange.

If the ORS 132 determines that the exchange computer system 110 is the destination of the received order or quote, the ORS 132 may forward the received order or quote to the order matching system 134.

The order matching system (OMS) 134 may include processing systems that analyze and manipulate orders according to matching rules stored in the database 138. The OMS 134 may also include an electronic book (EBOOK) of orders and quotes with which incoming orders to buy or sell are matched, according to the matching rules. The EBOOK may also be implemented in a separate database such as storage 140, which may include multiple mass storage memory devices for the storage of order and quote information. When the OMS 134 determines that a match exists for an order (for example, when a bid matches an offer for sale), the order matching system 134 may mark the matched order or quote with a broker-specific identifier so that the broker sending the order or quote information can be identified.

The index engine 136 may be implemented using a combination of software and hardware. The index engine 136 may, for example, be implemented as one or more hardware processors configured to execute one or more algorithms, as described in further detail below. An example configuration of an exchange computer system featuring an index engine 136 is further described in FIG. 2.

The index engine 136 may generate and disseminate an implied liquidity index value, to provide an option-based measurement of the market efficiency and liquidity of component stock options and the stock market index. The index engine 136 may generate the implied liquidity index value for the Standard and Poor's 500 Index, by following processes further described in FIG. 4 below. After generating the implied liquidity index value corresponding to the stock market index, the index engine 136 may disseminate the implied liquidity index to other exchanges (e.g., exchanges 112) and one or more user devices (e.g., user devices 116, 118, 120) by the network 114.

As noted above, the generation and dissemination of implied liquidity index values significantly reduces the bandwidth and computing resources required by both the exchange computer system 110 and networked computer systems (e.g., user devices 116, 118, and 120) in each of several ways.

For example, by generating and disseminating accurate values of an implied liquidity index, the index engine 136 relieves the multitude of systems receiving those values of the computational burdens associated with monitoring data flows representative of relevant market conditions, and with redundantly calculating estimations of the index. In at least this way, index engine 136 frees up computational resources throughout network 114.

Moreover, as a component of exchange computer system 110, index engine 136 is well suited to the role of a centralized and authoritative arbiter of index values, at least insofar as it is able to efficiently generate the values based on data to which exchange computer system 110 already has access. In contrast, and absent the service provided by index engine 136, other systems (e.g., user devices 116, 118, and 120) would need to redundantly devote significant bandwidth to monitoring this data.

As another example, index engine 136 vastly reduces the number of orders that need to be sent, received, and processed in connection with strategies leveraging the information captured and represented by the implied liquidity index. More specifically, the information provided by index engine 136 enables connected devices to practically leverage financial instruments based on the implied liquidity index. That, in turn, minimizes the number of orders involved in implementing and fulfilling complex strategies that would otherwise require trading of a variety of component options, with relatedly higher computational expenditure.

Additionally, the practical application of implied liquidity index values and related financial instruments enables fulfillment of these complex strategies with significantly less network traffic than would otherwise be necessary, at least by virtue of the reduced numbers of orders involved.

In at least these ways, the generation and dissemination of implied liquidity index values, and the processing of orders involving financial instruments related to the implied liquidity index, dramatically improves the computational efficiency with which complex strategies can be implemented and fulfilled.

For instance, the exchange computer system 110 could facilitate and fulfill large numbers of transactions for connected users implementing strategies involving implied liquidity, at a significant cost in bandwidth and processing resources. But exchange computer system 110 can alternatively facilitate implementation of similarly complex strategies involving financial instruments based on the implied liquidity index with far fewer transactions (and correspondingly less bandwidth and resource expenditure for all systems involved).

Alternatively, or in addition, index engine 136 may reduce the bandwidth and computing resources required by networked systems by computing and disseminating updated implied liquidity index values in response to events detected by exchange computer system 110 (for example, detected volume of orders, data traffic flow, trading patterns, or other market activity). Index engine 136 can, for example, be configured to generate and disseminate updated implied liquidity index values in response to detection of one or more of these events, with corresponding computational efficiencies for networked systems.

The exchange computer system 110 may also facilitate an order for a financial instrument corresponding to the implied liquidity index value. For example, the exchange computer system 110 may be configured to receive data from one or more user devices (e.g., user devices 116, 118, and 120) by the network 114 connected to the exchange computer system 110. The received data describes a request to enter the order for a financial instrument corresponding to the implied liquidity index value in the electronic order book 124. The implied liquidity index value generated by the index engine 136 provides additional market information by estimating liquidity, (e.g., a total normalized measure of availability of the component stock options on the stock market index) for the stock market index), so the exchange computer system 110 may facilitate a transaction for the order. The exchange computer system 110 facilitates the transaction by determining a second order in the electronic order book 124 matches the order described in the received data. The exchange computer system 110 may utilize the ORS 132 to route the order from the received data and the OMS 134 to match the second order in the electronic order book 124 to the order.

The exchange computer system 110 may also be configured to simultaneously receive (e.g., by the network 114 and ORS 132 of the exchange computer system 110) from one or more user devices, multiple orders for a financial instrument corresponding to the implied liquidity index value.

The order from the received data may be a market order and the financial instrument of the order corresponding to the implied liquidity index value is an implied liquidity index futures contract. In some implementations, other types of derivative contracts (e.g., forward, swaps, and options) may be traded based on the implied liquidity index. The user may purchase an implied liquidity index future and receive a strip of at-the-money options upon expiration of the future. In some implementations, the user may receive settlement of an options order by transferring the underlying asset of the options order to the user. In other implementations, the user may receive a cash-value settlement for the options order.

In some implementations, the exchange computer system 110 is a distributed computer system that includes an order entry port (e.g., by network 114), an order routing system (e.g., ORS 132), an order matching system (e.g., OMS 134), and an index engine (e.g., index engine 136). The distributed computer system may operate multiple hardware and software processes in parallel configurations. The order entry port receives the order from the data sent to the exchange computer system by a user device and the order routing system is configure to route the order to a destination associated with the order. As an example, the destination may include other exchanges 112, based on matching rules stored on database 138 and the configuration of the order matching system to match the order to the destination in the other exchanges 112.

Storage 140 and database 138 store and handle data in a manner that satisfies the privacy and security requirements of the exchange computer system 110 and its users, and may store one or more of telemetric data, user profiles, user history, and rules and algorithms for matching quotes, bids, and orders.

Upon completion of a trade (through the floor in open outcry as entered into the PAR system, or through automatic execution through the OMS 134 and auction engine 136), the fill information is passed through the OMS 134 and the ORS 132 to one or more user devices 116, 118, 120, and 124, and to the auction engine 136. The auction engine 136 matches the buy side and sell side of a trade, and forwards the matched trade to a third party organization that verifies the proper clearance of the trade, such as the Options Clearing Corporation (OCC) where the securities may be options, or Depository Trust Company (DTC) where the securities may be equities. The OMS 134 also formats the quote and sale update information and sends that information through an internal distribution system that refreshes display screens on the floor, in addition to submitting the information to a quote and trade dissemination service such as, in the case of options, the Options Price Reporting Authority (OPRA). In the case of Equities, the information would be submitted to the Securities Information Processor (SIP).

Figure 2:
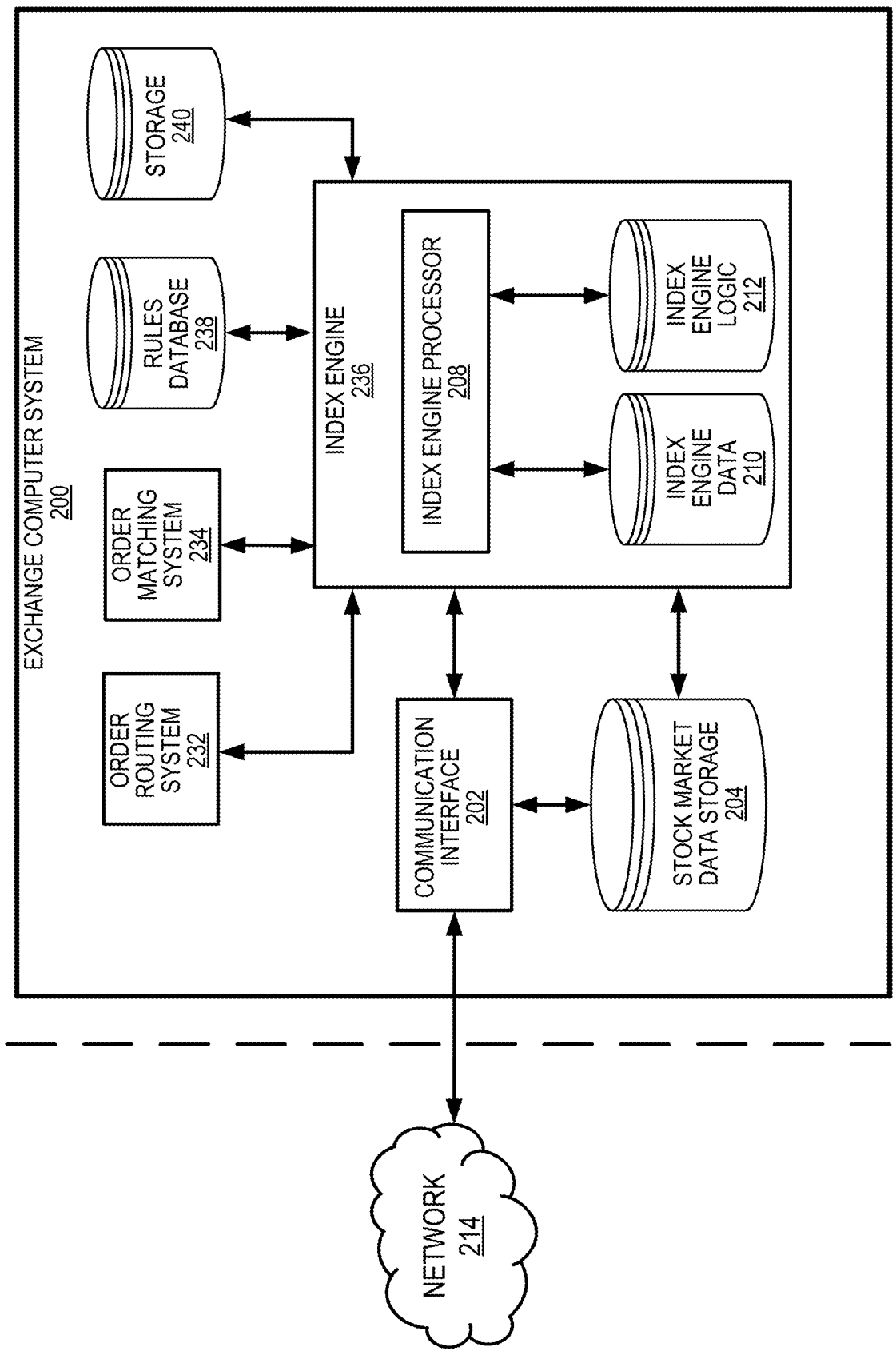
FIG. 2 is an example diagram of an exchange computer system including an index engine.

FIG. 2 is a diagram of an example exchange computer system 200 including an index engine 236 configured to generate an implied liquidity index and implied liquidity index values. The exchange computer system 200 may be implemented by software, hardware, or some combination as described herein. As an example, the exchange computer system 200 may be implemented as a server, a computer, or other device or processing component using proprietary software designed and implemented to achieve the functionality described herein. The exchange computer system 200 may be distributed or subdivided between a plurality of entities e.g., multiple computing devices.

The exchange computer system 200 may include a communication interface 202, coupled with a stock market data storage 204. The communication interface 202 may be communicatively linked to an index engine 236, which includes an index engine processor 208, index engine data 210, and index engine logic 212. The index engine 236 may also be communicatively linked to an ordering matching system 234, an order routing system 232, a rules database 238, and storage 240 of the exchange computer system 200. The communication links in the exchange computer system 200 may be established by a system bus, network, or one or more other connection mechanisms. As an example, the connection mechanisms may include a wired connection, a wireless connection, or a combination thereof. For example, the connection may be a physical connection, such as a wired Ethernet connection. In another example, the connection may be a wireless connection, such as a cellular telephone network, an 802.11, 802.16, 802.20 controls or components, a WiMax network, or any other type of network. Further, network 214 may be a public network, such as the Internet, a private network, such as an intranet, or combinations thereof, and may utilize a variety of networking protocols now available or later developed including, but not limited to TCP/IP based networking protocols.

The index engine processor 208 may include one or more processors, such as general-purpose processors (e.g., a microprocessor), special-purpose processors (e.g., an application-specific integrated circuit (ASIC) or digital-signal processor (DSP)), programmable-logic devices (e.g., a field programmable gate array (FPGA)), or any other processor components now known or later developed. The index engine processor 208 may carry out one or more instructions using one or more arithmetic, logical, and/or input/output operations. Though index engine processor 208 is illustrated as a single component, index engine processor 208 may be integrated in whole or in part with other components of the exchange computer system 200.

Data storage e.g., stock market data storage 204 and index engine data 210, may be a main memory, a static memory, or a dynamic memory. Stock market data storage 204 and storage for index engine data 210 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media, organic storage components, and the like. As an example, the stock market data storage 204 and storage for index engine data 210 may include a cache or random access memory for the index engine processor 208. Stock market data storage 204 and storage for index engine data 210 may be separate from the index engine processor 208, such as a cache memory of a processor, the system memory, or other memory. Stock market data storage 204 and storage for index engine data 210 may be an external storage device or database for storing data. Examples may include a hard drive, compact disc ("CD"), digital video disc ("DVD"), memory card, memory stick, universal serial bus ("USB") memory device, or any other device operative to store data.

As further shown, the index engine 236 may include index engine data 210 and/or index engine logic 212. The index engine data 210 may include one or more types of data suitable for a given implementation. For example, index engine data 210 may include data (such as input datasets) that may be stored in memory. Index engine logic 212 may include, for example, machine language instructions executable by index engine 236 to carry out various functions, such as the functionality of the methods and systems described herein. In some implementations, the functions, acts or tasks may be independent of the particular type of instructions sets, storage media, processor or processing strategy and may be performed by software, hardware, integrated circuits, firm-ware, micro-code and the like, operating alone or in combination. Processing strategies may include multiprocessing, multitasking, parallel processing and the like.

In the exchange computer system 200, the communication interface 202 may include one or more structures, and associated equipment, for receiving data from one or more sources and distributing data to a group of one or more destinations. In some implementations, the communication interface 202 may include one or more additional communication interfaces and can operate in different configurations (e.g., distributed system, parallel). The communication interface 202 may be configured to receive input datasets from one or more entities (e.g., user devices or other exchanges) and store all or part of the input datasets in stock market data storage 204. The communication interface 202 may also be configured to communicate all or part of the input datasets to the index engine 236 once the input datasets are stored or otherwise processed. The communication interface 202 may include a transceiver having one or more input/output ports connected to the network 214 to securely transmit implied liquidity data from the index engine 236 to user computing devices.

As an example, the input datasets are stored in stock market data storage 204 may be partitioned (e.g., horizontal, vertical, functional) into designated memory locations (e.g., virtual addresses) based on qualities of the input datasets, e.g., a type of stock market index, a type of stock market index option, a type of stock option, and a type of stock. In some implementations, the input datasets with data related to component stock options may be stored in stock market data storage 204 and include a linking identifier (e.g., address, memory mapping) to identify a corresponding stock for each of the component stock options. In some implementations, the stock market data storage 204 may be configured to receive an indicator describing the operating status (e.g., receiving, clearing, storing) input datasets of the communication interface 202.

The input datasets from the communication interface 202 may include financial market data (e.g., market intelligence) corresponding to a stock market index (e.g., Standard and Poor's 500 Index) and the component stocks corresponding to the stock market index. For example, financial market data may include volatilities, interest rates, returns (e.g., historical, expected), market capitalization, sector, prices, liquidity, and other metrics related to the component stocks and stock market index. Financial market data may also include measures, estimates, and other related data for options (e.g., calls, puts), futures, and other derivatives for the stock market index and component stocks. The input datasets may also include corresponding log files to describe and store the financial market data e.g., a log file describing volatility for each component stock option. The log files may include metadata to tag or characterize data, e.g., corresponding time periods for which the data was recorded. For example, the log files may include a tag to be used for sorting or filtering the data of the log files.

Upon receiving input datasets from the communication interface 202, including data stored in the stock market data storage 204, the index engine 236 may perform further processes including receiving requests and accessing metadata. The index engine 236 may perform operations using the index engine processor 208, with instructions stored in the index engine logic 212, and data stored in index engine data 210. The data stored in index engine data 210 may include all of or a subset (e.g., filtered) of the data stored in stock market data storage 204, where the subset of the data stored in the index engine data 210 is filtered based on a specified time period. The index engine 236 may perform operations on the index engine data 210 including deleting, archiving, tagging, and resetting. The index engine 236 can utilize metadata, including log files, to process (e.g., filtering, sorting) the index engine data 210.

The index engine 236 may also access other components of the exchange computer system 200 including the order matching system 234, order routing system 232, rules database 238, and storage 240. The order matching system 234 may be configured to match an order received from the user device (e.g. user devices 116, 118, and 120) to another order based on the matching rules stored in the rules database 238. The order routing system 232 may be configured to route the order received from the user device to a destination associated with the order. The storage 240 may include additional data from the exchange computer system 200, accessed by the index engine 236 for processing.

An exchange computer system 110 of FIG. 1 or exchange computer system 200 of FIG. 2 that includes the index engine 236 can be configured to generate an implied liquidity index and implied liquidity index values for a stock market index. For example, the index engine 236 can be configured (e.g., by index engine logic 212) to obtain data through the communication interface 202 such as data related to stocks for an underlying asset, data to the stock market index, and data related to stock options of the underlying asset. The index engine logic 212 configures the index engine 236 to process the data and perform the steps to generate an implied liquidity index and the corresponding implied liquidity index values, as described in reference to FIG. 4 below. By coupling the index engine 236 to exchange computer system components, such as order routing system 232, order matching system 234, rules database 238, etc., the index engine 236 allows the exchange computer system to be configured to generate an implied dispersion index that can be traded (e.g., executed through orders) to user devices (e.g., user devices 116, 118, and 120) described in reference to FIG. 1 above.

The index engine 236 and related components (e.g., index engine processor 208, index engine data 210, index engine logic 212) include software and hardware that are configured to generate the implied liquidity index and implied liquidity index values. In contrast to exchange computer systems without the index engine 236, the index engine 236 provides the exchange computer system 200 with a higher throughput to process signals (and associated data from the signals) between the exchange and data sources, e.g., stock market data from other exchange, order information from user devices. Furthermore, the index engine 236 is configured to process subsets of signals that are relevant to the generation of implied liquidity index values, among from large volumes of signals (e.g.,) data, received by the exchange computer system 200.

In some implementations, the communication interface 202 can be expanded to include additional ports that are configured to provide dataflow to and from the index engine 236 of the exchange computer system 200. The expansion of data flow ports that are uniquely configured the memory for the index engine processor 208 can be expanded to process additional data. In some implementations, the index engine logic 212 can be further programmed to correlate data received, e.g., by the communication interface 202, and thus allow the exchange computer system to pre-allocate resources to determine and implied liquidity index and implied liquidity index value.

In some implementation, the exchange computer system 200 can be configured to generate a notification (e.g., an alert) based on implied liquidity index values. The index engine 236 can generate implied liquidity index values, and the exchange computer system 200 can be configured to determine if an implied liquidity index value meets particular criteria or a condition. Examples of conditions can include the implied liquidity index value exceeding a threshold value, falling below a threshold value, or maintaining a value in a range of values for a duration of time. Upon detection of the criteria based on the implied liquidity index value, the exchange computer system 200 can generate an alert and provide the alert to computing devices that are connected to the exchange computer system 200, such as user devices 116, 118, and 120. The alert can be provided to other connected exchanges, e.g., exchanges 112.

The alert can indicate to receiving devices that the implied liquidity for a stock market index indicates an exchange computer system is likely to execute and facilitate orders based on liquidity of underlying assets, their options, and the stock market index made up of component stocks for the assets. In some cases, the alert indicates low liquidity, thus providing an indication that there is a low likelihood of orders executing and facilitating on the exchange computer system due to market conditions resulting in low liquidity. Providing the alert to computing devices can inform market participants that market conditions are resulting in highly illiquid markets, and can result in fewer orders being submitted to an order book of the exchange computer system. Thus, the alert allows for improved timing when receiving, submitting, and executing orders, as fewer resting orders remain on the order book during periods of low implied liquidity, and more orders can be traded and executed during periods of high implied liquidity.

As noted above, the exchange computer system 110 can securely transmit a series of implied liquidity index values generated based on data received over successive periods of time to connected user computing devices (e.g., user devices 116, 118, 120) that are themselves configured to display the implied liquidity index values. The values may be displayed, for example, within a graphical user interface of an application that facilitates continuous real-time trading, through the exchange computer system, of financial instruments related to the implied liquidity index.

Figure 3:
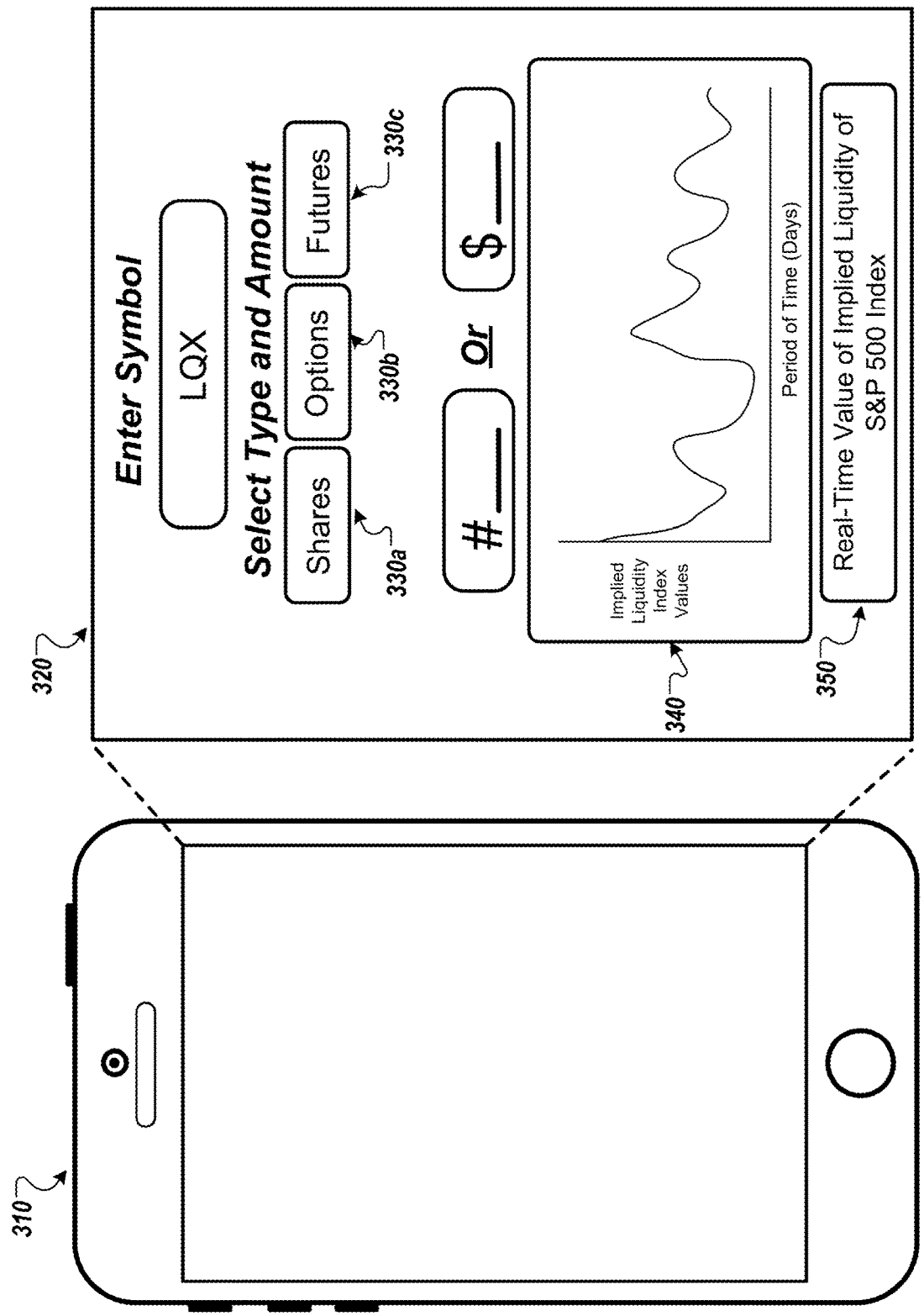
FIG. 3 is an illustration of an exemplary graphical user interface for display of implied liquidity index values and trading of financial instruments based on the implied liquidity index.

FIG. 3 is an illustration of a graphical user interface on a device 310 for displaying market data, displaying implied liquidity index values, submitting one or more orders involving an implied liquidity index, and for exercising one or more orders involving the implied liquidity index. A client device (e.g., user devices 116, 118, and 120) can display the graphical user interface after receiving implied liquidity data from the exchange computer system. A user of a device 310 can interact with a user interface panel 320 created by the device 310 after receiving implied liquidity index data (e.g., index engine data 210) from the exchange computer system by a computer network (e.g., network 214). The user interface panel 320 can include fields that enable a user to enter a symbol (e.g., a stock or option symbol), select the type of the trade and specify an amount. As an example, the user can enter a symbol (e.g., "LQX") corresponding to the implied liquidity index to submit an order (e.g., market order) through the device 310.

The user interface panel 320 may receive a series of implied liquidity index values over successive periods of time, and the manner in which the user interface panel 320 displays these values and/or related data may be customizable based on user preferences or other parameters. As an example, the information displayed in user interface panel 320 may be customized to include both numerical and/or graphical representations of past, present, and/or projected implied liquidity index values. The user interface panel 320 may additionally be customized to display information regarding present, past, and/or projected activities based on index values (e.g., trading of financial instruments based on the implied liquidity index, and other market activity related to the implied liquidity index). For example, the user interface panel 320 may optionally display values of, and activity related to, financial instruments related to the implied liquidity index, including index futures and component options.

The manner in which user interface panel 320 displays information may also vary depending on other parameters. For example, the computational resources of the user devices connected via network 114 to the exchange computer system 110 can vary greatly, and the user interface panel 320 may be adapted for display on each particular user device based on parameters associated with that device (including screen size, display resolution, processing speed, and available bandwidth). For instance, a user operating a PC may benefit from display of a larger amount of information, whereas a user interacting with the exchange via a smart phone might benefit from a more streamlined presentation of information. As another example, where bandwidth or processing resources are limited, user interface panel 320 can be configured to display information in less resource-intensive ways (e.g., through simplified graphics and text).

In general, various suitable types of panels 320 can be used to enter order information and additional information from a user. When a user selects a selected type 330a, 330b, 330c, by interacting the user interface panel 320, the device 310 can use the implied liquidity data to provide the user with additional customizations for the order. For example, selecting "Options" 330b can cause the user device present the user with the ability to select "Call" or "Put" types, or a strategy type, such as a spread, involving financial instruments based on the implied liquidity index. A graph 340 of implied liquidity values for an index (e.g., from the implied liquidity data) for a period of time (e.g., 30 days) can be provided and displayed to the panel 320. A real-time value 350 of the implied liquidity index can also be provided and displayed to the panel 320. The user of the device 310 may select additional options (e.g., time windows, historical liquidity data) for the graph 340. The graph 340 may display a series of implied liquidity index values over various periods based on user customization. As an example, the user interface panel 320 may be filter by one or more parameters, in which the corresponding graph 340 and real-time values 350 may be refreshed or updated on the device 310 to include values based on filtered data. In some implementations, the real-time value 350 can be a historical value of the implied liquidity index on a particular time and/or date (e.g., month, day, and year), retrieving the implied liquidity index data (e.g., value) for the particular time and date.

Figure 4:
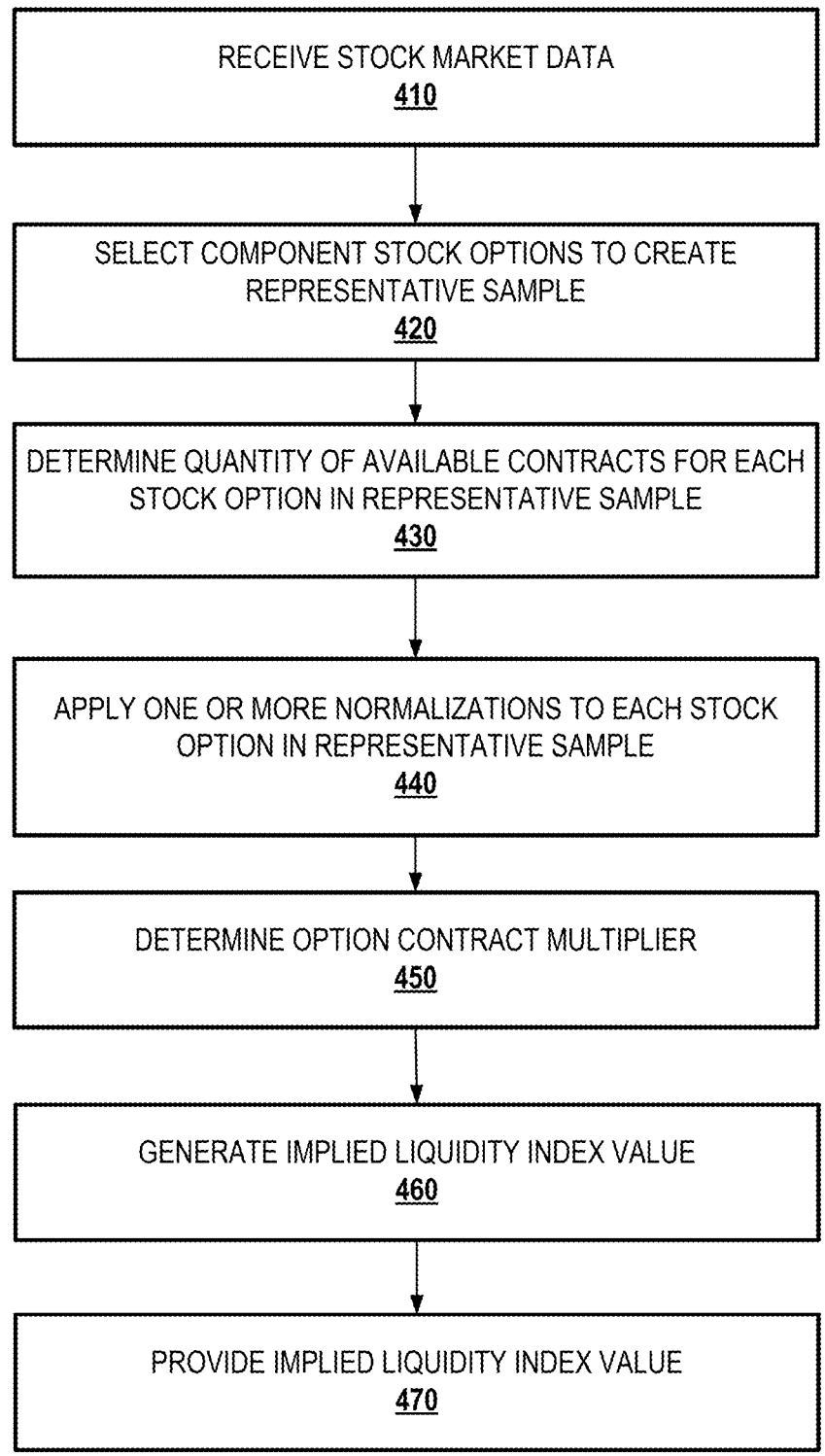
FIG. 4 is a flowchart of an example process for generating and disseminating an implied liquidity index and implied liquidity index value.

FIG. 4 is a flowchart of an exemplary process 400 for generating and providing an implied liquidity index value, by using normalization techniques to compute implied liquidities of component stocks options. Briefly, the process 400 includes the steps of receiving data related to a stock market, including stock market options data, and stock market index (410), selecting one or more component stock options to represent the stock market index (420), determining a quantity of available contracts with corresponding bid-ask pairs for each stock option in the representative sample (430), applying one or more normalizations to each stock option in the representative sample, with each of the one or more normalizations based on price, relative bid-ask spread, volatility, or expiry of each stock option (440), determining an option contract multiplier (450), generating the implied liquidity index value (460), and providing the implied liquidity index value (470).

The process 400 includes the step of receiving data related to a stock market, such as stock market options data and stock market index data (410). For example, the exchange computer system 110 may receive data related to the Standard and Poor's 500 Index from a remote computing device associated with one of the brokers/market makers 122, by a network 114. In some implementations, the source of the data related to the stock market index is co-located with exchange computer system 110, but can also be provided by other exchanges 112 or by other sources over network 114.

The data related to the stock market options, e.g., stock market options data, can be historical data. The historical data can be captured periodically, continually, or appropriate frequency. For example, the historical data can include 15-second snapshots of options data over a past time period in days, weeks, months, etc. The data related to the stock market options can also be referred to as "options data."

In some implementations, the options data is obtained from a device configured to provide securities information, e.g., Options Price Reporting Authority. The options data can be top-of-book data, e.g., pricing information related to best bids and best asks for options on the stock market index. In some cases, the data related to the stock market options and/or the stock market index can include implied volatilities, historical volatilities, and other types of analytic metrics, such as the Greeks (e.g., delta, gamma, theta, vega). The data related to the stock market index may include classes of component stocks that make up the stock market index and market data related to the classes of component stocks (e.g., average daily volume, national best bid and offer, strike price, premiums, contract sizes, expiration dates).

The metadata for the data related to the stock market may be in a particular format that identifies information about the data. In some implementations, the metadata may include identifiers that indicate information about the data related to the stock market. As an example, the data can include a string indicating a symbol, data, type of contract, and strike price. In this example, the string "SPX220121C00200" can indicate a symbol of "SPX", a date of "220121" or "Jan. 21, 2022" in Year, Month, Day format, a "C" indicating a call option (alternatively, "P" for a put option), and "00200" indicating a strike price of $200 for the call option. The index engine described in reference to FIG. 2 above can process strings of metadata accordingly.

The process 400 includes selecting one or more component stock options to represent the stock market index (420). The component stocks may be selected based on market capitalization of the component stock relative to the stock market index (e.g., large-cap, small-cap). In some implementations, the component stocks may be selected based on multiple market conditions and characteristics, such as an amount of time the component stock has been listed on the stock market index and analytical metrics (e.g., working capital ratio, average daily volume, bid-ask spread). The component stocks corresponding to the component stock options can also be selected based on the volatility of the component stock (e.g., above or below a threshold value, between two threshold values) in the stock market index. Additionally, the exchange computer system 110 can implement rules from database 138 including selecting stocks based on liquidity class, availability of liquid call-put options pairs, and exclusion of pre-specified restricted securities. In some implementations, the database 138 includes algorithms configured to select the component stocks for corresponding component stock options.

In some implementations, selecting the component stock options can be based on the size and/or price information, such as ask price, ask size, bid size, and/or bid price for the option. As an example, the component stock options can be filtered for pricing or size information set to a particular value (e.g., zero). This is desirable because some contracts can include suspicious (e.g., orders submitted by malicious parties) or erroneous parameters (e.g., an erroneous trade with a substantial price difference). The component stock options can also be filtered for a particular time period, such as short term (e.g., 0-7 days), medium term (e.g., 0-30 days), or long term (e.g., a time period longer than 30 days). By filtering component stock options for different ranges of time periods, different portions of liquidity in the stock market can be characterized by the implied liquidity index.

In some implementations, the component stock options are selected such that every stock corresponding to a component stock option has been listed on the stock market for at least a threshold period of time. For example, stocks that are at least on the stock market for one year can have their corresponding stock options selected as component stocks. In some cases, the component stock options stock options are selected such that every stock corresponding to a component stock option has an expiry date in a range of dates, e.g., between two dates, but can also be selected for expiry dates before or after a particular date. In some implementations, the component stock options are selected based on a moneyness of the stock, e.g., a spot price of the stock and a strike price of the corresponding component stock option. For example, component stock options with a moneyness percentage (e.g., difference between underlying price and exercise price, divided by the asset price) within a threshold value can be selected as the representative sample.

The process 400 includes determining a quantity of available contracts with corresponding bid-ask pairs for each stock option in the representative sample (430). The step 430 can include analyzing the received options data from order books of exchanges to determine quantities of the bid-ask pairs for each stock option identified in the representative sample. By analyzing the options data, a number of bid-ask pairs can be determined for each stock option—in addition to the selection criteria for selecting the component stock options.

The process 400 includes applying one or more normalizations to each stock option in the representative sample, with each of the one or more normalizations based on price, relative bid-ask spread, volatility, or expiry of each stock option (440). The normalizations provide additional measures for quantifying implied liquidity of the options on the stock market to account for different types of underlying assets represented in the option, different sizes of options available in the stock market, and different depths of options in the stock market (e.g., number of open buy or sell orders on order books of an exchange).

The step 440 can include determining and applying a relative bid-ask normalization. The relative bid-ask normalization is based on the bid-ask spread, e.g., the difference in bid price and asking price, for an options contract. A higher bid-ask spread for an options contract indicates smaller liquidity, relative to a liquidity of an options contract with a smaller bid-ask spread. By normalizing options contracts representing different underlying assets by bid-ask spread, a relative bid-ask provides a more accurate representation of liquidity as different asset classes can have varying liquidity sensitivity to bid-ask spread.

As an example, the relative bid-ask normalization can be represented by an operator $g(\cdot)$, in which $g(\cdot)=1$ represents no normalization. The relative bid-ask normalization can be an inverse normalization of the underlying price $S_t$ for an asset and a difference between a bid price $V_k^{bid}$ and an ask price $V_k^{ask}$ for an options contract for the asset. A threshold a can be applied to the inverse normalization, in which a relative bid-ask spread below the threshold indicates that the component stock is highly liquid with an optimal relative bid-ask spread (e.g., efficiently tradable) or desirable price for both buyer and seller. A relative bid-ask spread above the threshold a indicates that the component stock has low liquidity with an inefficient relative bid-ask spread, e.g., the top-of-book is too deep relative to other assets, and that relative bid-ask spread for the asset may be too large.

Equation (1) below depicts an example of relative bid-ask spread normalization g(·) with an inverse normalization with threshold a:

$$g(\cdot) = \frac{\alpha S_t}{V_k^{ask} - V_k^{bid}} \quad (1)$$

As an example measure of liquidity, the threshold a and the normalization of relative bid-ask spread can be described as a number of basis points (e.g., percentage points relative to price, interest rate) from the data related to the stock market. A normalized liquidity can be determined, as an example, using a threshold a=1 basis point, with a quantity of 10 options contracts on top-of book, and a relative bid-ask spread $$\frac{S_t}{V_k^{ask} - V_k^{bid}} = 2$$

basis points. The normalized liquidity can be computed as a ratio of a (e.g., one basis point) to the relative bid-ask spread $$\frac{S_t}{V_k^{ask} - V_k^{bid}},$$

(e.g., two basis points) multiplied by 10 options contracts (e.g., the number of options contracts available that meet the highest bid or lowest ask, depending on the type of contract), resulting in a normalized liquidity ratio of 5. Because the depth for the market corresponds to the 10 options contracts (e.g., 10 contracts available at top-of-book), and the above-computed normalized liquidity is 5, the normalized liquidity indicates is less the market has low liquidity. A low liquidity can result in fewer transactions matched and executed by the exchange computer system, with the unfulfilled standing orders remaining unmatched in the order book.

As another example, using the same threshold a and a different relative bid-ask spread $$\frac{S_t}{V_k^{ask} - V_k^{bid}} = 0.5$$

basis points, e.g., dependent on the bid and ask prices of the options contracts, can result in a different normalized liquidity value. The resulting liquidity ratio is 1/0.5 basis points*10 options contracts, or a ratio of 20. Thus, the normalized liquidity ratio at 20 is greater than the market depth at 10 options contracts, indicating a market that has high liquidity. A high liquidity can result in more transactions matched and executed by the exchange computer system, with fewer unfulfilled standing orders in the order book, as they are matched and executed.

In some implementations, the relative bid-ask spread normalization can be an inverse bounded normalization with threshold a, a minimum bound $\omega_m^g$ and maximum bound $\omega_M^g$. Thus, the relative bid-ask spread normalization with thresholds and bounds can be represented by Equation 2 below:

$$g(\cdot) = \min(\max(\omega^g, \omega_M^g), \omega_m^g); \quad \omega = \frac{\alpha S_t}{V_k^{ask} - V_k^{bid}} \quad (2)$$

As an example, setting the maximum bound $\omega_M^g=1$ results in limiting the normalized liquidity measure to the observed top-of-book depth.

The step 440 can include determining and applying a price normalization, also referred to as a "Greeks" normalization. The price normalization can be represented by an operator h(·), in which h(·)=1 represents no normalization. Applying the price normalization allows for incorporating the exposure of an underlying asset, thereby providing a liquidity measure to financial instruments that may be designed to have a direct relationship to a notional value of an underlying asset, e.g., delta-one products, spot transactions, forwards, and futures. An exposure for an underlying asset may be defined in time-value or Greeks. For example, trading long-dated options can provide vega (v) exposure, measuring an option contract's price sensitivity to changes in volatility of the underlying asset. As another example, trading short-dated options can provide gamma (Γ) exposure, measuring a rate of change of delta (Δ) over time. Because the delta measures a first order price sensitivity of an option to changes in price of the underlying asset, the gamma (Γ) describes a second order price sensitivity of the option to changes in price of the underlying asset. Thus, applying the price normalization based on Greeks to obtain a liquidity measure for the implied liquidity index captures accuracy of the type of exposure for the options in the index.

Examples of price normalization can include h(·)=1 for no normalization, h(·)=Δ for delta normalization, h(·)=v for Vega normalization, h(·)=Γ for gamma normalization, and h(·)=V for time-value normalization, in which V represents the price of the option contract (e.g., at bid price or ask price, depending on the type of contract.)

The step 440 can include and applying an expiry normalization. The price normalization can be represented by an operator f(·), in which f(·)=1 represents no normalization. In some cases, the previously described price normalization may demand incorporating time-to-expiry as a factor in generating the implied liquidity index by applying the expiry normalization. For example, selecting normalizations of h(·)=Γ or h(·)=v may further include applying the expiry normalization that is time weighted. A time-weighted expiry normalization based on a reference time $\tau_e$ to expiration in days and an expiry time $\tau_j$ to expiration for the option contract:

$$f(\cdot) = \sqrt{\frac{\tau_e}{\tau_j}} \quad (3)$$

As an example of expiry normalization, Table 1 below depicts exemplary values for Weighted Vega Multipliers for option contracts with different times to expiration, using a reference time $\tau_e$ of one month:

TABLE 1

| $\tau_j$ (tenors in days) | f(•) | Sample Vega v | Weighted Vega |
|---|---|---|---|
| 7 | 2.070 | 2.20 | 4.55 |
| 30 | 1.000 | 4.32 | 4.32 |
| 90 | 0.577 | 8.38 | 4.84 |

TABLE 1-continued

| $\tau_j$ (tenors in days) | f(·) | Sample Vega v | Weighted Vega |
|---|---|---|---|
| 365 | 0.287 | 16.79 | 4.82 |
| 730 | 0.203 | 19.85 | 4.03 |

As depicted in Table 1, the expiry normalization function decreases the effect, e.g., longer expiry time, of the sample vega for tenors of options contracts above the reference $\tau_e$=30 days by applying f(·) to obtain the weighted vega. Similarly, for option contracts with tenors below the reference $\tau_e$=30 days applies the f(·) to obtain the weighted vega to increase the effect of the smaller tenors, e.g., shorter expiry time.

The process 400 determining an option contract multiplier (450). The option contract multiplier can be tied to the type of stock market index, e.g., 100 share multiplier for an S&P 500 index. In some implementations, the option contract multiplier can be 1, 10, 100, 1000, although any ratio/size of contract may be used. The option contract multiplier may be represented by B.

The process 400 includes generating the implied liquidity index value (460). Generating the implied liquidity index value includes incorporating any combination of the normalization operators described in reference to step 440 above. For example, generating the implied liquidity index value can be determined by Equation 4 below:

$$LQX_t^e = \beta \sum_i^{expiries} f(\cdot) \sum_i^{strikes_i} \sum_{k=\{call,put\}} g(\cdot)h(\cdot)\left(Q_{i,j,k}^{Ask} + Q_{i,j,k}^{Bid}\right) \quad (4)$$

As depicted in Equation 4 above, $LQX_t^e$ is the implied liquidity index (LQX) value at any independent time t for an reference time e. As described in reference to selecting component stock options, the reference time e (similar to $\tau_e$ described in step 440) can include different time periods for liquidity of a stock market to be characterized by the implied liquidity index. A top-of-book available quantity for option contracts is described by $Q_{i,j,k}$ for call and put options with expiry i, strike k, and call/put j (e.g., indicating the jth option among the available options). Thus, $Q_{i,j,k}^{Ask}$ represents the top-of-book available quantity for puts (e.g., right to sell contracts at their asking price) and $Q_{i,j,k}^{Bid}$ represents top-of-book available quantity for calls (e.g., right to buy contracts at their bidding price). The expiries indicated in the first summation of Equation 4 indicates expiries for all contracts in the specified area of the options contract, as described in step 440.

As a first example, an implied liquidity index can be a vega-weighted index, with a relative bid-ask spread normalization, described in Equation 5 below:

$$LQX_t^{1,e} = \quad (5)$$
$$\beta \sum_i^{expiries} \sqrt{\frac{\tau_e}{\tau_j}} \sum_i^{strikes_i} \sum_{k=\{call,put\}} \min(\max(\omega^g, \omega_M^g), \omega_m^g)v_{j,k}\left(Q_{i,j,k}^{Ask} + Q_{i,j,k}^{Bid}\right)$$

The above Equation 5 is an implied liquidity index with an expiry normalization $$f(\cdot) = \sqrt{\frac{\tau_e}{\tau_j}},$$

a relative-bid ask spread normalization of $\min(\max(\omega^g, \omega_M^g), \omega_m^g)$, where $$\omega_m^g = \frac{\alpha S_t}{V_k^{ask} - V_k^{bid}},$$

and a price normalization of $h(\cdot)=v_{i,j,k}$, e.g., price-normalized based on the vega for the options contracts. The bounds for Equation 5 included a minimum bound $\omega_m^g=-\infty$ and maximum bound $\omega_M^g=\infty$, capturing liquidity measures at any range relative to the top-of-book depth, e.g., including extremely high and low values of liquidity for contracts in options data from an options marks. In some cases, other desirable bounds can include the following pairs of minimum $\omega_m^g$ and maximum $\omega_M^g$ bounds: ($-\infty$, $\infty$), ($-2,2$), ($-\infty$, 1).

The reference time for the implied liquidity index described by Equation 5 can be $\tau_e$=30 days. In this example, the implied liquidity index measures a normalized index of a stock market index (e.g., S&P 500) for stock options, accounting for the option's sensitivity based on a 30 day period of implied volatility, e.g., a 30-day target Vega. The component stock options for the implied liquidity index can be selected with any term length, such as standard options with 3rd Friday of the month expiration dates, weekly index options that expire daily, etc. In some cases, to calculate time to expiration, standard index options can be considered as expired at the beginning of trading on settlement days for the index, e.g., 3rd Friday of the month, and weekly options can be considered as expired at close of training for the index.

As a second example, an implied liquidity index can be a delta-weighted index, with a relative bid-ask spread normalization, described in Equation 6 below:

$$LQX_c^{1,e} = \quad (5)$$
$$\beta \sum_i^{expiries} \sum_i^{strikes_i} \sum_{k=\{call,put\}} \min(\max(\omega^g, \omega_M^g), \omega_m^g)\Delta_{j,k}\left(Q_{i,j,k}^{Ask} + Q_{i,j,k}^{Bid}\right)$$

This second example represented by Equation 6 is similar to the first example represented by Equation 5, but does not include an expiry normalization (e.g., f(·)=1) and utilizes a delta ($\Delta$) price normalization, rather than the vega (v) price normalization. This second example may be desirable for a price-normalized index from delta-normalization, rather than implied volatility changes from vega-normalization.

In some implementations, the implied liquidity index value described in step 460 above can be tailored for generate different types of implied liquidity indices. For example, a global liquidity index can be negated that captures liquidity of a particular options market, e.g., options data related to an options index. This allows for comparison of liquidities of an options index at different time instances, two or more different options indices with similar underlying assets, and/or two or more different options indices with different underlying assets.

Another type of liquidity index includes bucketized implied liquidity indices. Each implied liquidity index from multiple implied liquidity indices can each correspond to implied liquidity of an options within an expiry bucket. For example, a first implied liquidity index for an options index can determine implied liquidity for the options index for a first time period, e.g., between 0 and 7 days to expiry. A second implied liquidity index for an options index can determine implied liquidity for the options index for a second time period, e.g., between 8 and 30 days to expiry. This allows for time-series analysis and comparison for different options indices, but also provides time information as a trading signal. The trading signal may be used by market participants to enter orders with improved timing at ideal implied liquidity values, thereby allowing for orders to be more readily matched and executed by the exchange computer system, e.g., in contrast to orders submitted for options during periods of low liquidity.

An additional type of implied liquidity index includes expiry-targeted implied liquidity indices. The expiry targeted indices can present liquidity of a specific target option expiry, an expiry data for options at a particular number of days to expiry, e.g., 7 days, 30 days. Similar to the bucketized implied liquidity indices, the expiry-targeted implied liquidity allows for time-series analysis and comparison for different options indices, as well as time information as a trading signal for market participants.

In some implementations, an implied liquidity index can be tailored as a contract implied liquidity index. A contract implied liquidity index can specify a particular type of stock market index, and compares the implied liquidity values for different option contracts for the stock market index. In this way, the implied liquidity for each contract listed on an options index for a stock market index can be compared, e.g., to select and execute an options contract within a threshold moneyness or range of expiry dates.

The process 400 includes providing the implied liquidity index value (470). For example, the implied liquidity index value may be provided by the exchange computer system 110 to user devices 116, 118, and 120, brokers/market makers 122, and other exchanges 112 over the network 114. The implied liquidity index value may be disseminated to one or more remotely located device (e.g., user devices 116, 118, and 120) or co-located devices e.g., a graphical user interface on a display (e.g., panel 320 on user device 310 in FIG. 3) by the network 114 from the exchange computer system 110.

Figure 5:
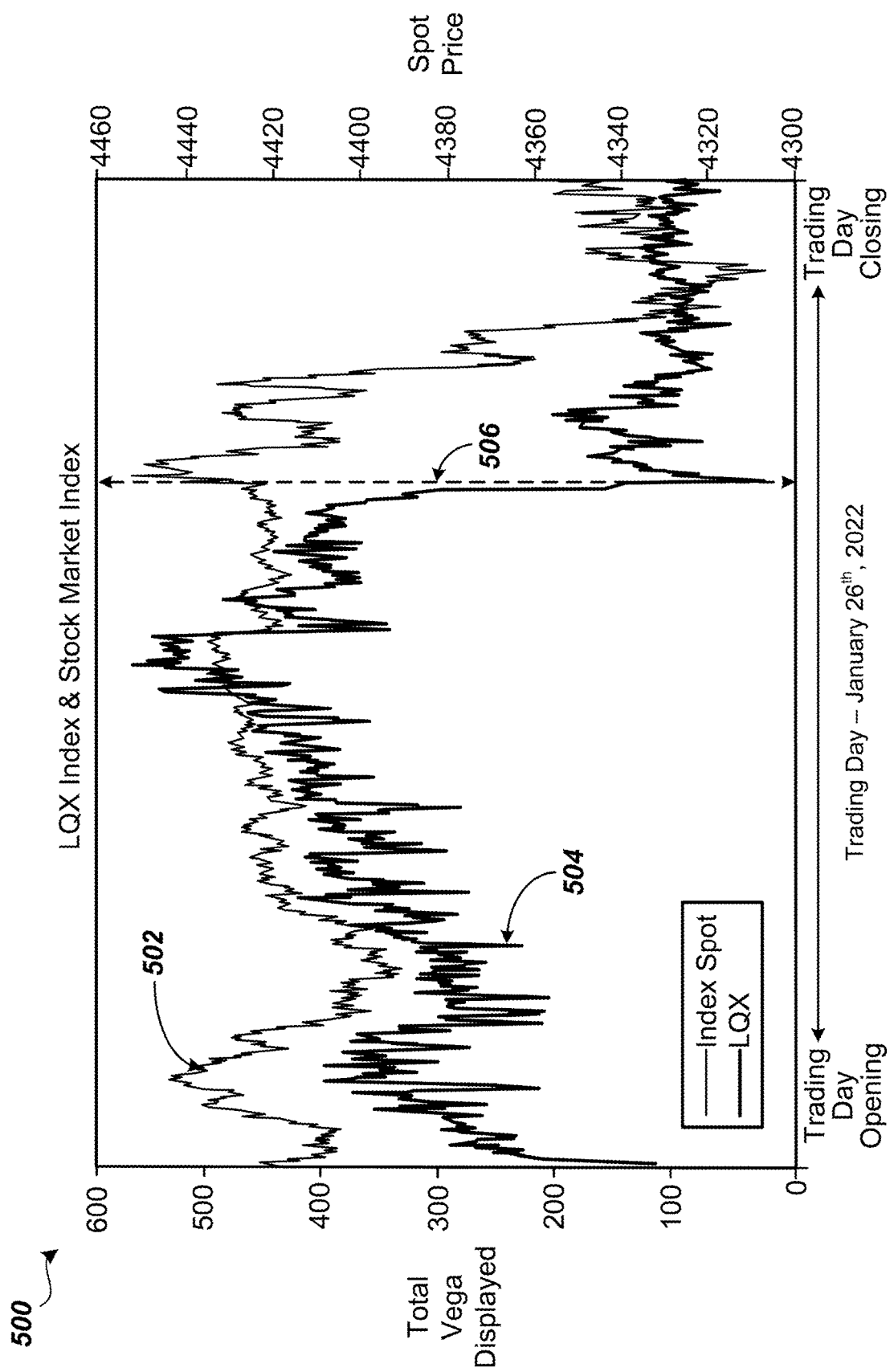
FIG. 5 is an example graph of implied liquidity index values.

FIG. 5 is an example graph 500 of implied liquidity index values throughout a trading day for a stock market index. The graph 500 illustrates line 502 of spot price values for a stock market index (e.g., S&P 500), with corresponding spot price values on an axis at the right-hand side of the graph 500, e.g., ranging from 4300 to 4460. The graph 500 illustrates line 504 of implied liquidity index values of implied liquidity index (LQX) over the trading day, with corresponding total vega displayed on an axis at the left-hand side of the graph 500, e.g., ranging from 0 to 600. The graph 500 illustrates a time instance 506, which points out a disparity in correlation between the implied liquidity index values and the spot prices of the stock market index.

For example, the graph 500 shows a relatively positive correlation between lines 502 and 504 until approximately time instance 506 during the trading day, in which the implied dispersion index values are inversely correlated to the spot prices of the stock market index. The spot prices indicated by line 502 depict a substantial drop in spot price after time instance 506, e.g., between a peak value for spot price at ~$4460 to a level around ~$4340. The implied liquidity index depicts a drop in implied liquidity of the stock market index corresponding to the time instance 506 in which the drop in spot price occurs. The drop in implied liquidity demonstrates a low liquidity level that can generate high volatility (e.g., including market participants further submitting or canceling orders in response to the volatility), thereby resulting in a sharp change (e.g., a decrease) in the spot price. In particular, low liquidity can result in a drop in spot prices as the low liquidity demonstrates the orders for the stock market index are not being efficiently facilitated, e.g., an excess of open orders on the order book of the exchange computer system. A spot price of the stock market index drops as options for the index are difficult to sell, and thus less valuable, e.g., resulting in a drop in spot price.

Implementations have been described, but other implementations are within the scope of the following claims.

A number of implementations have been described hereinabove. It should however be understood that various modifications may be made without departing from the spirit and scope of the disclosure. For example, various forms of the flows shown above may be used, with steps re-ordered, added, or removed. Accordingly, other implementations are within the scope of the disclosure and claims.

Embodiments and all of the functional operations and/or actions described in this specification may be implemented in digital electronic circuitry, or in computer software, firmware, or hardware, including the structures disclosed in this specification and their structural equivalents, or in combinations of one or more of them. Embodiments may be implemented as one or more computer program products, e.g., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Moreover, a computer may be embedded in another device, e.g., a tablet computer, a mobile telephone, a personal digital assistant (PDA), a mobile audio player, a Global Positioning System (GPS) receiver, to name just a few. Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT), liquid crystal display (LCD), or light emitting diode (LED) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while actions are depicted in the drawings in a particular order, this should not be understood as requiring that such actions be performed in the particular order shown or in sequential order, or that all illustrated actions be performed, to achieve desirable results. For example, in some implementations of FIG. 4, step 440 may be performed before or at the same time as step 430, and step 450 may be performed before or at the same time as action 420. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims. For example, the actions recited in the claims may be performed in a different order and still achieve desirable results.

What is claimed is:

1. An exchange computer system configured to continuously, securely, dynamically, and efficiently generate and disseminate implied liquidity index values, the exchange computer system comprising:
  at least one communication interface that is configured to receive, from one or more remote computing devices connected to the exchange computer system via a computer network, data related to a plurality of stocks, data related to a stock market index, and data related to a plurality of stock options, wherein the plurality of stock options correspond to the plurality of stocks, wherein the plurality of stocks are traded on a stock market, and wherein the at least one communication interface comprises an order entry port configured to receive an order for a financial instrument associated with an implied liquidity index for the implied liquidity index values;
  an order routing system coupled to the at least one communication interface and configured to route the order according to a destination associated with the order;
  at least one non-transitory computer-readable medium configured to store, for a particular period of time, the data related to the plurality of stocks, the data related to the stock market index, and the data related to the plurality of stock options; and
  an index engine comprising at least one hardware processor coupled with the at least one non-transitory computer-readable medium, wherein the at least one non-transitory computer-readable medium is further configured to store computer-executable instructions that when executed by the at least one hardware processor, cause the index engine to perform processes comprising:

automatically selecting, based on the data related to the plurality of stock options, a plurality of component stock options that together provide a representative sample of the stock market index while a number of stock options included in the plurality of component stocks options is maintained below a threshold number, thereby reducing processing overhead associated with generating an implied liquidity index value;

determining, based on the data related to the plurality of stock options, a quantity of available stock option contracts for each of the stock options in the plurality of component stocks options, wherein the quantity of available stock option contracts comprises determining a number of available stock options with a corresponding bid price and a number of available stock options with a corresponding ask price;

applying, based on the data related to the plurality of stock options, a price normalization to the quantity of available stock option contracts for each of the stock options in the plurality of component stock options, wherein the price normalization comprises determining at least one of (i) an option contract price, or a rate of change, for each of the stock options in the plurality of component stock options;

applying, based on the data related to the plurality of stock options and the data related to the plurality of stocks, a relative bid-ask spread normalization for each of the stock options in the plurality of component stock options, wherein the relative bid-ask spread normalization is based on a bid price and an ask price of a component stock option and an underlying price of the corresponding stock for each of the stock options in the plurality of component stock options;

applying, based on the data related to the plurality of stock options, an expiry normalization for each for the stock options in the plurality of component stock options, where the expiry normalization comprises determining a time weighting for each of the stock options in the plurality of component stock options;

determining, based on the plurality of component stock options, an option contract multiplier, wherein the option contract multiplier indicates a number of shares representing in each of the stocks in the plurality of component stock options;

dynamically generating, for the particular period of time, an implied liquidity index value based at least one of (i) the option contract multiplier, (ii) the price normalization, the relative bid-ask spread normalization, or (iv) expiry normalization of each of the plurality of stock options in the plurality of component stock options;

generating a computer-generated alert indicative of a likelihood of orders to be executed by the exchange computer system based on the implied liquidity index value; and securely transmitting the implied liquidity index value and the computer-generated alert to a user computing device connected to the exchange computer system via the computer network and configured to display the implied liquidity index value within a graphical user interface of an application and continuous real-time trading, through the exchange computer system, of financial instruments related to an implied liquidity index for which the implied liquidity index value was generated.

2. The exchange computer system of claim 1, wherein the exchange computer system is a distributed computer system, and wherein data related to the order is provided by a user through the graphical user interface of the application.

3. The exchange computer system of claim 1:
wherein the exchange computer system further comprises an order matching system configured to match the order to another order based on one or more matching rules.

4. The exchange computer system of claim 1, wherein the implied liquidity index value provides a single, standardized, option-based measure of market efficiency and liquidity of the plurality of component stock options and the stock market index.

5. The exchange computer system of claim 1, wherein the implied liquidity index is a total normalized measure of availability of the plurality of the component stock options on the stock market index, based on implied volatility of the plurality of component stock options.

6. The exchange computer system of claim 1, wherein applying the price normalization based on the rate of change comprises determining at least one of (i) a time sensitivity, (ii) a price sensitivity, (iii) a volatility sensitivity, (iv) or an interest rate sensitivity, for each of the stock options in the plurality of component stock options.

7. The exchange computer system of claim 1, wherein the plurality of component stocks options are automatically selected based at least in part by one of (i) an ask price, (ii) an ask size, (iii) a bid size, or (iv) a bid price.

8. The exchange computer system of claim 7, wherein at least one of (i) the ask price, (ii) the ask size, or (iii) the bid size, is greater than zero.

9. The exchange computer system of claim 7, wherein the bid price is greater than or equal to zero.

10. The exchange computer system of claim 1, wherein the plurality of component stock options are selected such that every stock corresponding to a component stock option has been listed on the stock market for at least a threshold period of time.

11. The exchange computer system of claim 1, wherein the plurality of component stock options are selected such that every stock corresponding to a component stock option has an expiry date between a first date and a second date, before the first date, or after the second date.

12. The exchange computer system of claim 1, wherein the plurality of component stock options are selected based on a moneyness of every stock corresponding to a component stock option, wherein the moneyness of a stock is based on a spot price of the stock and a strike price of the corresponding component stock option.

13. The exchange computer system of claim 1, wherein applying the relative bid-ask spread normalization comprises calculating a product of (i) an inverse of a difference between the bid price from the ask price of the component stock option, (ii) a threshold value, and (iii) the underlying price of the corresponding stock, for each of the stock options in the plurality of component stock options.

14. The exchange computer system of claim 13, wherein the threshold value is a number of basis points based the data related to the stock market.

15. The exchange computer system of claim 13, wherein applying the relative bid-ask spread normalization comprises applying at least one of (i) a minimum bound, or (ii)

a maximum bound, to the product of the inverse of the difference, the threshold value, and the underlying price of the corresponding stock, for each of the stock options in the plurality of component stock options.

16. The exchange computer system of claim 1, wherein determining the time weighting for each of the stock options in the plurality of component stock options comprises computing a ratio of (i) a reference time until expiration to (ii) an expiry time until expiration, of each of the stock options in the plurality of component stock options.

17. The exchange computer system of claim 1, wherein generating the implied liquidity index comprises generating multiple implied liquidity values, each of the multiple implied liquidity values corresponding to at least one of (i) a global stock market index, (ii) an target expiry-based index, (iii) a bucket expiry-based index, or (iv) a stock option contract-based index, from each of the plurality of stock options in the plurality of component stock options.

18. A method implemented by an exchange computer system for continuously, securely, dynamically, and efficiently generating implied liquidity index values, the method comprising:
receiving, from one or more devices and by at least one communication interface of the exchange computer system, data related to a plurality of stocks, data related to a stock market index, and data related to a plurality of stock options, wherein the plurality of stock options correspond to the plurality of stocks, wherein the plurality of stocks are traded on a stock market, wherein the at least one communication interface comprises an order entry port configured to receive an order for a financial instrument associated with an implied liquidity index for implied liquidity index values, and wherein the at least one communication interface is coupled to an order routing system configured to route the order according to a destination associated with the order;
storing, by at least one non-transitory computer-readable medium and for a particular period of time, the data related to the plurality of stocks, the data related to the stock market index, and the data related to the plurality of stock options, wherein the at least one non-transitory computer-readable medium is coupled to at least one hardware processor of an index engine of the exchange computer system;
selecting, by the at least one hardware processor and based on the data related to the plurality of stock options, a plurality of component stock options;
determining, by the at least one hardware processor and based on the data related to the plurality of stock options, a quantity of available stock option contracts for each of the stock options in the plurality of component stocks options, wherein the quantity of available stock option contracts comprises determining a number of available stock options with a corresponding bid price and a number of available stock options with a corresponding ask price;
applying, by the at least one hardware processor and based on the data related to the plurality of stock options, a normalization comprising one or more of (i) a price normalization to the quantity of available stock option contracts for each of the stock options in the plurality of component stock options, (ii) a relative bid-ask spread normalization for each of the stock options in the plurality of component stock options, or (iii) an expiry normalization for each for the stock options in the plurality of component stock options;
determining, by the at least one hardware processor and based on the plurality of component stock options, an option contract multiplier, wherein the option contract multiplier indicates a number of shares representing in each of the stocks in the plurality of component stock options;
dynamically generating, by the at least one hardware processor and for a particular period of time, an implied liquidity index value based the option contract multiplier and the applied normalization;
generating, by the at least one hardware processor, a computer-generated alert indicative of a likelihood of orders to be executed by the exchange computer system based on the implied liquidity index value; and
securely transmitting, by the at least one hardware processor, the implied liquidity index value and the computer-generated alert to a device connected to the exchange computer system, wherein the device is configured to display the implied liquidity index value within a graphical user interface of an application and continuous real-time trading, through the exchange computer system, of financial instruments related to an implied liquidity index for which the implied liquidity index value was generated.

19. The method of claim 18, wherein the exchange computer system is a distributed computer system, wherein data related to the order is provided by a user through the graphical user interface.

20. At least one non-transitory computer-readable storage media storing instructions causing an exchange computer system to perform operations for continuously, securely, dynamically and efficiently generating and disseminating implied liquidity index values, the operations comprising:
receiving, from one or more devices and by at least one communication interface of the exchange computer system, data related to a plurality of stocks, data related to a stock market index, and data related to a plurality of stock options, wherein the plurality of stock options correspond to the plurality of stocks, wherein the plurality of stocks are traded on a stock market, wherein the at least one communication interface comprises an order entry port configured to receive an order for a financial instrument associated with an implied liquidity index for implied liquidity index values, and wherein the at least one communication interface is coupled to an order routing system configured to route the order according to a destination associated with the order;
storing, by the at least one non-transitory computer-readable storage media and for a particular period of time, the data related to the plurality of stocks, the data related to the stock market index, and the data related to the plurality of stock options, wherein the at least one non-transitory computer-readable storage media is coupled to at least one hardware processor of an index engine of the exchange computer system;
selecting, by the at least one hardware processor and based on the data related to the plurality of stock options, a plurality of component stock options;
determining, by the at least one hardware processor and based on the data related to the plurality of stock options, a quantity of available stock option contracts for each of the stock options in the plurality of component stocks options, wherein the quantity of available stock option contracts comprises determining a number of available stock options with a corresponding bid price and a number of available stock options with a corresponding ask price;

applying, by the at least one hardware processor and based on the data related to the plurality of stock options, a normalization comprising one or more of (i) a price normalization to the quantity of available stock option contracts for each of the stock options in the plurality of component stock options, (ii) a relative bid-ask spread normalization for each of the stock options in the plurality of component stock options, or (iii) an expiry normalization for each for the stock options in the plurality of component stock options;

determining, by the at least one hardware processor and based on the plurality of component stock options, an option contract multiplier, wherein the option contract multiplier indicates a number of shares representing in each of the stocks in the plurality of component stock options;

dynamically generating, by the at least one hardware processor and for a particular period of time, an implied liquidity index value based the option contract multiplier and the applied normalization;

generating, by the at least one hardware processor, a computer-generated alert indicative of a likelihood of orders to be executed by the exchange computer system based on the implied liquidity index value; and securely transmitting, by the at least one hardware processor, the implied liquidity index value and the computer-generated alert to a device connected to the exchange computer system, wherein the device is configured to display the implied liquidity index value within a graphical user interface of an application and continuous real-time trading, through the exchange computer system, of financial instruments related to an implied liquidity index for which the implied liquidity index value was generated.

* * * * *